United States Patent Office 2,905,077
Patented Sept. 22, 1959

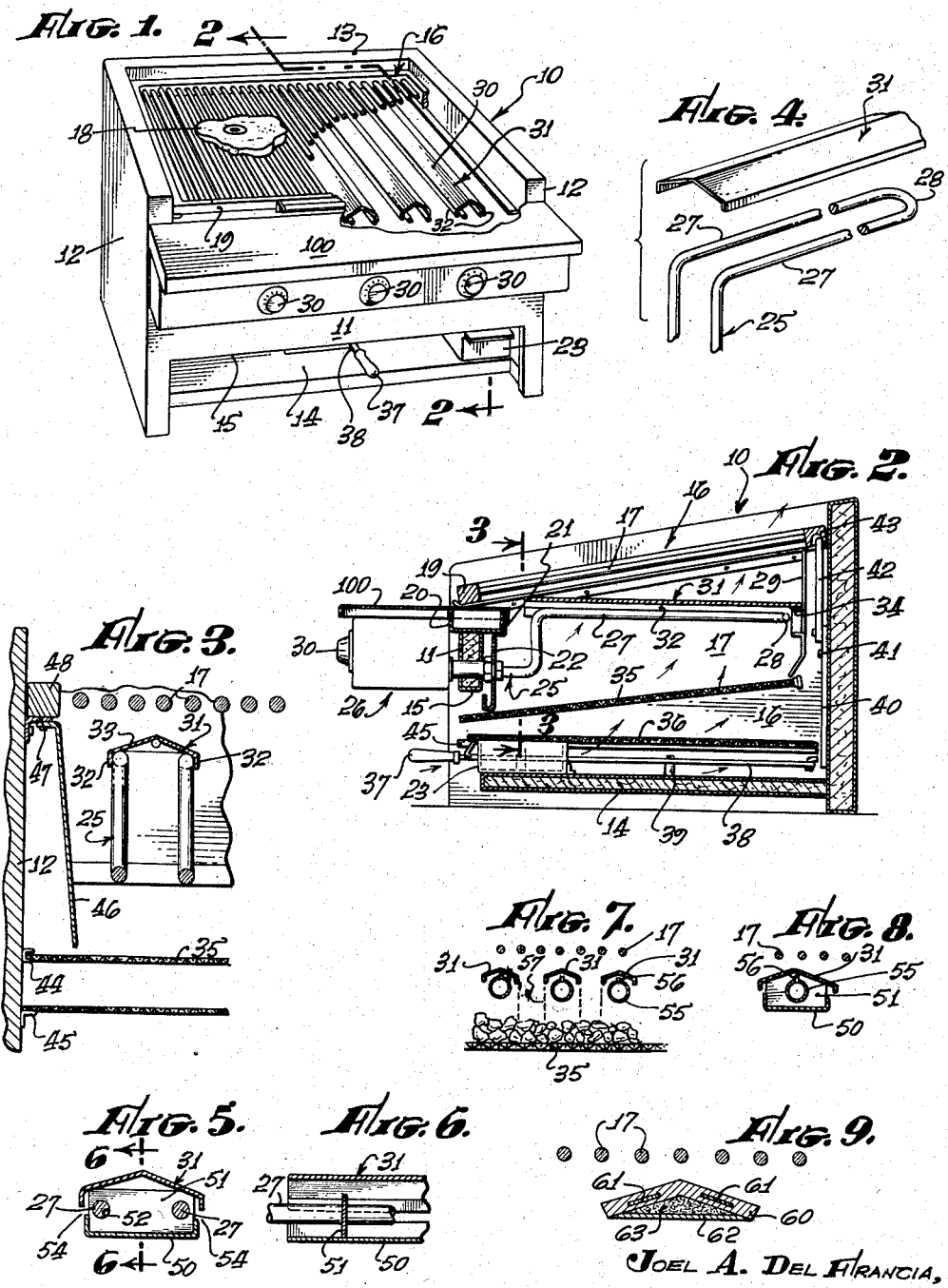

2,905,077
QUICK HEAT BROILER
Joel Alfred Del Francia, Los Angeles, Calif.
Application April 14, 1958, Serial No. 728,146
18 Claims. (Cl. 99—446)

This invention relates generally to improvements in cooking broilers having grids upon which edibles are to be cooked. More particularly the invention has to do with what may be referred to as a quick heat broiler incorporating a novel arrangement and combination of heating and radiant heat control structure operative to keep the broiler and particularly the bottom thereof cool, the same and additional structure also being operable to control interception and ignition of droppings falling from an edible on the grid in such a way that the advantages of charcoal broiling may be realized through the production of flames rising to the grid and without certain disadvantages encountered in prior flame producing broilers.

Referring to the latter disadvantages, it has been the practice to produce flames and smoke in a broiler without using charcoal through controlling droppings of grease falling to a grease receiving surface below the heater elements and there being ignited by downwardly radiated heat. This practice results in undesirable heat production in the lower interior of the broiler, as a consequence of the considerable flaming required for rising through the heaters to the grid and the edible thereon, the extreme height of the flames only being producible by allowing somewhat excessive dripping of grease from the grid to the ignition surface.

The present novel quick heat broiler overcomes the disadvantages in operation of the prior broilers mentioned above in that advantages of flame control are maintained and the disadvantages of excessive heating of the lower interior and bottom of the broiler are eliminated together with excessive flame and smoking. This is accomplished through the provision of hood means overlying the heaters below the grid for radiating to the grid heat received from the heaters and for intercepting droppings including grease falling from an edible on the grid to ignite same. The heaters and hood means have open formation to pass unintercepted droppings falling from the edible and grid and there is also means underlying the open formation for intercepting droppings falling therethrough. The hood means overlying the heaters preferably presents an extended surface area to the grid for intercepting and igniting substantial portions of the falling droppings so that sufficient flames and smoke is produced above the hoods to give the desired charred flavor and appearance to the edible, the required amount of flames being minimized due to the location of the hoods directly over the grill. Any unignited droppings on the hoods may tumble therefrom through the open formation, along with falling unintercepted droppings for reception on the means underlying the open formation, at which location in the lower interior of the broiler no flames will be produced. Therefore, the lower interior of the broiler is kept cool at all times, the flames being confined to the upper interior of the broiler, although in one form of the invention refractory bodies are disposed in a bed underlying the heaters and the open formation between the hoods and the heaters for intercepting and igniting only a portion of the dropping grease to produce additional edible charring flames and smoke.

These and other objects and features of the invention, as well as the details of an illustrative embodiment, will be more fully understood from the following detailed description of the drawings, in which:

Fig. 1 is a frontal perspective showing of a preferred embodiment of the quick heat broiler;

Fig. 2 is a vertical section taken on line 2—2 of Fig. 1;

Fig. 3 is a vertical section taken on line 3—3 of Fig. 2;

Fig. 4 is an exploded fragmentary perspective showing an electrical heater element and a hood overlying same;

Fig. 5 is a vertical cross-section through an electrical heater element, hood and reflector;

Fig. 6 is a section taken on line 6—6 of Fig. 5;

Fig. 7 is a vertical cross-section through a plurality of gas burners, hoods overlying the burners, grid bars overlying the hoods, a screen underlying the burners and refractory bodies carried by the screen;

Fig. 8 is a vertical cross-section through a gas burner, hood overlying the burner, grid bars overlying the hood, and a reflector directly underlying the burner and hood; and Fig. 9 is a vertical cross-section through a further modification of the invention incorporating an electrical heater element embedding the hood.

In Figs. 1 through 3, the burner housing 10 is shown to include front, side and rear walls 11 through 13, respectively, and a horizontal bottom wall 14, all of which contain suitable insulation between spaced parallel panels. The front wall contains a transversely elongated opening 15 extending between the side walls at the level of the lower interior 16 of the housing for admitting a draft of air as indicated by the arrows in Fig. 2, the air rising within the broiler housing.

Overlying the upper interior of the housing is a heavy metallic grid 16 including laterally spaced cross members or bars 17 that extend lengthwise from the rear to the front of the grid and are inclined downwardly from the horizontal in a frontward direction, as shown. Inclination of the cross members as described causes drainage of at least some of the grease from an edible 18 forwardly along the bars toward the transversely extending forward frame member 19 directly overlying the transversely extending receptacle 20 into which some of the grease drains. The receptacle is supported above the housing forward wall 11 by an offset shoulder 21 in a heat reflector panel 22 inwardly spaced from the forward wall 11. Grease in the receptacle drains therealong toward the right side of the housing as viewed in Fig. 1 and then drains into a removable pan 23 supported on the bottom 14 of the broiler and exposed through forward opening 15 in the front wall to be accessible for removal.

Coming now to a description of the heating means underlying the grid in the upper interior of the housing, a series of electrical heating rods 25 extend through the front wall 11 from the control unit 26, the rods at the inside of panel 22 being bent vertically upwardly and then horizontally to extend at a uniform level from front to rear across the upper interior 17. Each rod comprises two laterally spaced stretches 27 that are joined by a U-bend 28 directly forwardly of an upright rear reflector panel 29 within the housing interior as shown in Fig. 2. Electrical energization of the parallel rods is controlled by manipulation of the knobs 30 of the control unit shown in Figs. 1 and 2. A horizontal work shelf 100 conveniently overlies the control unit 23 at the level of the grid forward end.

Supported on each pair of rod stretches 27 is a metallic hood 31 having channel shape with two side flanges 32 extending downwardly from the outer edges of an inverted V-shaped cover 30. The apex of the V-shaped cover is supported at the rearward end of each hood by a pin 34 projecting forwardly from the rear reflector panel 29, and the flanged sides 32 of the hood are spaced apart so as to closely receive therebetween the rod stretches 27, which orient the hood to extend horizontally from front to rear within the broiler housing. As can be seen from Figs. 1 through 3, heat from the electrically energized resistance rods is directly transferable to the hoods 31 and the extensive surface area of the latter presented to the grid bars 17 radiates heat upwardly to the bars and an edible supported thereon. At the same time, the hoods are adapted to intercept a substantial portion of the droppings including grease falling off the edible for igniting the grease to create flame and smoke rising to desirably char the edible. Any of the droppings remaining unignited after falling on the hoods are adapted to fall off the hood surfaces due to the inclination thereof, and downwardly through the open formation between the hoods and the heating rods, together with the unintercepted droppings falling from the edible and the grid.

Underlying the opening between the hoods and heating rods is a screen 35 adapted to intercept the falling droppings and at the same time to receive heat radiated downwardly from the rods, passing only a small portion of such radiation downwardly therethrough. Since the screen is disposed above the bottom of the broiler, air entering through the front opening 15 passes upwardly through the screen cooling it and pre-heating the air so that the air will more rapidly combust grease droppings on the hoods. At the same time, the droppings falling on the screen 35 are cooled by the rising air and the screen is spaced sufficiently below the heater rods that the droppings are not ignited in this embodiment. Therefore, there is no flaming in the lower interior of the broiler, and this circumstance in combination with the breaking up of incident heat radiation on screen 35 serves to keep the lower interior at a relatively cool temperature.

A second screen 36 is disposed in underlying relation to screen 35 and extends horizontally therebeneath for further dissipating heat radiation. As a result, the control means for manipulating the forward tilting of the grid end that extends beneath the lower screen is kept cool so that the user may grasp the handle 37 of the control means and work it back and forth between the side walls of the broiler for lifting and lowering the grid without danger of burning his hand.

The control means includes generally an arm 38 to which the handle is attached, the arm being pivoted at 39 and attached to a right angular crank 40. The latter is pivoted at 41 adjacent the rear wall of the broiler and is in turn connected to a support rod 42 directly engaging the transverse rear frame member 43 of the grid for lifting and lowering same in response to swinging of arm 38. As shown in Fig. 2 the upper screen 35 is also forwardly tilted and closely underlies the lower dimensions of the forward and rearward panels 22 and 29 for confining heat radiation between those panels and above the screen. Tilting of the screen also enables solid edible droppings to tumble forwardly and downwardly on the screen for collection at the front of the screen near the front opening 15. Both screens 35 and 36 are supported as shown in Fig. 3 by side flanges 44 and 45, adapting the screens to be readily removed frontwardly through the opening 15. Fig. 3 also shows one of the two side reflector panels 46 extending vertically from the upper screen upwardly to a side wall flange 47 above the level of the hoods 31. Flanges 47 at opposite sides of the housing interior support the grid side frame members 48 when the grid is in its lowermost position. At this time, more of the grease is adapted to drop from the grid bars onto the hoods than when the grid is elevated to tilt forwardly at a more extreme angle. Thus, the amount of grease droppage and corresponding flame production for charring purposes is readily controlled by manipulation of handle 37.

Figs. 5 and 6 show the addition of a U-shaped or channel reflector panel 50 directly underlying the stretches 27 of the heating rod and the hood 31 for reflecting upwardly downward radiation from the heating rods. Also shown is a vertical spacer 51 spacing the hood and reflector and acting as a hanger for supporting the reflector, the spacer containing openings 52 through which the rod stretches 27 extend. In Figs. 5 and 6 reflector 50 is spaced from the hood to provide air vents 54 therebetween.

In Figs. 7 and 8 a plurality of gas burners 55 are shown underlying the hoods 31, the burners being shown in the form of gas conduits having openings 56 at the tops thereof through which combustible gas may flow directly beneath the hoods. As before, air may pass upwardly through the screen 35 for combustion with the gas. Also the hoods and burners have open formation to pass droppings from the edible as between the broken lines indicated at 57. In the Fig. 7 embodiment, a bed of refractory bodies is supported on the screen 35 for intercepting the droppings, and is sufficiently close to the burners and hoods so that heat radiated downwardly will ignite the grease droppings to provide additional flame and smoke rising through the opening formation to the grid bars 17. Flame control is provided through the mechanism for lifting and lowering the grid and for changing the degree of tilt thereof so as to control the amount of grease dropping downwardly on the hoods and upon the refractory bodies.

In Fig. 8 a spacer 51 is shown between the hood 31 and reflector 50 underlying the heater and the hood, the purpose of the latter reflector being a reflect upwardly the heat radiation from the burner so as to increase upward heat radiation from the hood.

Fig. 9 shows a thickened cast iron hood 60 having inverted V-shaped cross section, with elongated electrically conductive panel heaters 61 embedding the sloping branches of the hood, the heaters extending horizontally and lengthwise of the hood. A heat reflector sheet 62 underlies the heaters and hood for reflecting upwardly the heat radiated downwardly by the hood and heaters, and suitable insulation 63 fills the space between the reflector and hood. Typical insulation for this purpose comprises glass wool or ceramic material.

I claim:

1. A quick heat broiler, comprising an upright housing, a grid including spaced cross bars overlying the upper interior of the housing, heating means underlying the grid, hood means overlying the heating means below the grid for radiating upwardly heat received from the heating means and for intercepting droppings falling from an edible in the grid to ignite same, said heating and hood means having open formation to pass unintercepted droppings falling from said edible, and means underlying said heating and hood means and openly exposed to the grid through said open formation for intercepting droppings falling therethrough the upper surface of said hood means sloping downwardly and terminating at a lower edge off which said droppings may fall.

2. A quick heat broiler, comprising an upright housing, a grid including spaced cross bars overlying the upper interior of the housing, heating means underlying the grid, hood means overlying the heating means below the grid for radiating upwardly heat received from the heating means and for intercepting droppings falling from an edible in the grid to ignite same, said heating and hood means having open formation to pass unintercepted droppings falling from said edible, and means underlying said heating and hood means and openly exposed to the grid through said open formation for intercepting droppings falling therethrough and vertically spaced sufficiently below said heating means that unignited droppings intercepted thereby will remain unignited by said heating means the upper surface of said hood means sloping downwardly and terminating at a lower edge off which said droppings may fall.

3. A quick heat broiler, comprising an upright housing, a grid including spaced cross bars overlying the upper interior of the housing, heating means underlying the grid, hood means overlying the heating means below the grid and presenting extended surface area to the grid for radiating to the grid heat received from the heating means and for intercepting a substantial portion of the droppings falling from an edible on the grid to ignite same, said heating and hood means having open formation to pass intercepted droppings falling off said hood means and unintercepted droppings falling from said edible, and means underlying said heating and hood means and openly exposed to the grid through said open formation for intercepting droppings falling therethrough the upper surface of said hood means sloping downwardly and terminating at a lower edge off which said droppings may fall.

4. A quick heat broiler, comprising an upright housing, a grid including spaced cross bars overlying the upper interior of the housing, heating means underlying the grid, hood means overlying the heating means below the grid and presenting extended surface area to the grid for radiating to the grid heat received from the heating means and for intercepting a substantial portion of the droppings falling from an edible on the grid to ignite same, said heating and hood means having open formation to pass intercepted droppings falling off said hood means and unintercepted droppings falling from said edible, and means underlying said heating and hood means and openly exposed to the grid through said open formation for intercepting droppings falling therethrough, said last named means having perforations to pass air upwardly therethrough to said hood means for combusting said droppings intercepted thereby the upper surface of said hood means sloping downwardly and terminating at a lower edge off which said droppings may fall.

5. A quick heat broiler, comprising an upright housing, a grid including spaced cross bars overlying the upper interior of the housing, heating means underlying the grid, hood means overlying the heating means and vertically spaced below the grid for radiating to the grid heat received from the heating means and for intercepting droppings falling from an edible on the grid to ignite same, said heating and hood means having open formation to pass intercepted droppings falling off said hood means and unintercepted droppings falling from said edible, means underlying said heating and hood means and openly exposed to the grid through said open formation for intercepting droppings falling therethrough, and means within the housing for adjusting the vertical spacing between said grid and hood means the upper surface of said hood means sloping downwardly and terminating at a lower edge off which said droppings may fall.

6. A quick heat broiler, comprising an upright housing, a grid including spaced cross members overlying the upper interior of the housing, heating means underlying the grid, hood means overlying the heating means and vertically spaced below the grid for radiating to the grid heat received from the heating means and for intercepting droppings including grease falling from an edible on the grid to ignite same, said heating and hood means having open formation to pass intercepted droppings falling off said hood means and unintercepted droppings falling from said edible, means underlying said open formation for intercepting dropping falling therethrough, and means engageable with the grid for displacing the grid vertically between an upper position in which the grid cross members are tilted from the horizontal for draining grease downwardly therealong toward one side of the housing and a lower position in which grease falls from said cross members into the housing interior.

7. A quick heat broiler, comprising an upright housing, a grid including spaced cross members overlying the upper interior of the housing, a plurality of heaters underlying the grid, a plurality of hoods overlying the heaters and vertically spaced below the grid and presenting extended surface area to the grid for radiating to the grid heat received from the heaters and for intercepting a substantial portion of the droppings including grease falling from an edible on the grid to ignite same, said heaters and hoods having open formation to pass unintercepted droppings falling from said edible, means underlying said open formation for intercepting droppings falling therethrough, and means for adjusting the vertical spacing between said grid and hoods and the angularity relative to horizontal of said grid cross members whereby the relative amounts of grease draining downwardly along said cross members and falling into said housing interior may be controlled.

8. The invention as defined in claim 7, including a plurality of heat reflectors directly underlying said heaters.

9. The invention as defined in claim 7, comprising electric heating elements transversely spaced within said housing interior.

10. The invention as defined in claim 7, comprising a plurality of gas burners transversely spaced within said housing interior.

11. The invention as defined in claim 7, in which the top surfaces of said hoods are tilted from the horizontal for spilling heavier droppings therefrom.

12. The invention as defined in claim 7, in which said means for intercepting droppings falling through said open formation includes a screen spaced above the bottom of the housing, said screen being operable to intercept a substantial portion of downward heat radiation from said heaters.

13. The invention as defined in claim 12, in which said housing has an air draft opening in the side thereof below the level of said screen for passing air upwardly through the screen in cooling relation therewith.

14. The invention as defined in claim 13, in which said means for intercepting droppings falling through said open formation includes a second screen spaced below and underlying the first screen.

15. The invention as defined in claim 7, in which said means for intercepting droppings falling through said open formation includes a bed of refractory bodies.

16. The invention as defined in claim 7 in which said hoods are horizontally longitudinally elongated and have inverted V-shaped cross section in vertical lateral planes.

17. The invention as defined in claim 16 in which said heaters contact said hoods, and including horizontally elongated reflectors underlying said heaters and hoods for reflecting upwardly heat radiated downwardly.

18. The invention as defined in claim 17 including insulation between said heaters and reflectors.

References Cited in the file of this patent

UNITED STATES PATENTS

| | | |
|---|---|---|
| 1,010,169 | Noreck | Nov. 28, 1911 |
| 1,504,102 | Davis | Aug. 5, 1924 |
| 2,180,868 | Dunning | Nov. 21, 1939 |